US012479740B2

(12) United States Patent
Xu et al.

(10) Patent No.: US 12,479,740 B2
(45) Date of Patent: Nov. 25, 2025

(54) LITHIUM NICKEL MANGANESE COBALT OXIDE HIGH-NICKEL SINGLE-CRYSTAL POSITIVE ELECTRODE MATERIAL AND PREPARATION METHOD THEREFOR

(71) Applicant: GEM (WUXI) ENERGY MATERIALS CO., LTD., Wuxi (CN)

(72) Inventors: Kaihua Xu, Wuxi (CN); Wei Li, Wuxi (CN); Dechong Liu, Wuxi (CN); Jun Xie, Wuxi (CN); Ningjing Liao, Wuxi (CN); Yang Shi, Wuxi (CN); Xiaoyan Zhou, Wuxi (CN); Yujun Chen, Wuxi (CN); Shiguo Xu, Wuxi (CN)

(73) Assignee: GEM (WUXI) ENERGY MATERIALS CO., LTD., Wuxi (CN)

( * ) Notice: Subject to any disclaimer, the term of this patent is extended or adjusted under 35 U.S.C. 154(b) by 0 days.

(21) Appl. No.: 18/723,511

(22) PCT Filed: Jul. 29, 2022

(86) PCT No.: PCT/CN2022/108807
§ 371 (c)(1),
(2) Date: Jun. 24, 2024

(87) PCT Pub. No.: WO2023/124051
PCT Pub. Date: Jul. 6, 2023

(65) Prior Publication Data
US 2024/0417275 A1    Dec. 19, 2024

(30) Foreign Application Priority Data
Dec. 30, 2021   (CN) .......................... 202111653919.7

(51) Int. Cl.
H01M 4/36    (2006.01)
C01G 53/50   (2025.01)
C30B 29/22   (2006.01)
H01M 4/525   (2010.01)
H01M 4/62    (2006.01)
H01M 10/42   (2006.01)
H01M 4/02    (2006.01)

(52) U.S. Cl.
CPC .............. C01G 53/50 (2013.01); C30B 29/22 (2013.01); H01M 4/366 (2013.01); H01M 4/525 (2013.01); H01M 4/62 (2013.01); H01M 10/4235 (2013.01); *C01P 2002/52* (2013.01); *C01P 2004/03* (2013.01); *C01P 2004/84* (2013.01); *C01P 2006/40* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2018/0026266 A1* | 1/2018 | Choi ............... | H01M 4/505 429/223 |
| 2018/0138497 A1 | 5/2018 | Rolff et al. | |
| 2020/0144618 A1 | 5/2020 | Lee et al. | |
| 2021/0242459 A1 | 8/2021 | Seo et al. | |
| 2021/0367233 A1 | 11/2021 | Gan et al. | |
| 2022/0190316 A1 | 6/2022 | Seo et al. | |

FOREIGN PATENT DOCUMENTS

| | | | | |
|---|---|---|---|---|
| CN | 103943845 A | * | 7/2014 | |
| CN | 104201337 B | * | 1/2017 | |
| CN | 107710461 A | | 2/2018 | |
| CN | 110699744 A | | 1/2020 | |
| CN | 110931768 A | | 3/2020 | |
| CN | 111689528 A | * | 9/2020 | ............ C01G 53/50 |
| CN | 111952581 A | | 11/2020 | |
| CN | 112086628 A | | 12/2020 | |
| CN | 112259727 A | | 1/2021 | |
| CN | 113424340 A | | 9/2021 | |
| CN | 113445127 A | | 9/2021 | |
| CN | 114447297 A | | 5/2022 | |
| EP | 3879606 A1 | | 9/2021 | |
| EP | 3879607 A1 | | 9/2021 | |

(Continued)

OTHER PUBLICATIONS

International Search Report issued on Oct. 26, 2022 for related PCT /CN2022/108807.

(Continued)

*Primary Examiner* — David P Turocy
(74) *Attorney, Agent, or Firm* — MagStone Law, LLP; Enshan Hong

(57) ABSTRACT

A method of preparing lithium nickel manganese cobalt oxide high-nickel single-crystal positive electrode material comprises the following steps: mixing and ball milling nickel cobalt manganese hydroxide with a lithium source, zirconium oxide, tungsten oxide, and sodium carbonate, then performing primary sintering, pulverizing, and then obtaining an lithium nickel manganese cobalt oxide high-nickel single-crystal positive electrode material intermediate, the temperature of the primary sintering being 50-150° C. higher than a normal sintering temperature; and evenly mixing the lithium nickel manganese cobalt oxide high-nickel single-crystal positive electrode material intermediate and a coating agent, and then performing secondary sintering to obtain the lithium nickel manganese cobalt oxide high-nickel single-crystal positive electrode material.

3 Claims, 4 Drawing Sheets

(56) References Cited

FOREIGN PATENT DOCUMENTS

| | | |
|---|---|---|
| JP | 2020123440 A | 8/2020 |
| WO | 2019194609 A1 | 10/2019 |
| WO | 2021006127 A1 | 1/2021 |

OTHER PUBLICATIONS

Written Opinion issued on Oct. 26, 2022 for related PCT /CN2022/ 108807.
First Office Action issued on Apr. 26, 2023 for related China Patent Application No. 202111653919.7.
Second Office Action issued on Dec. 27, 2023 for related China Patent Application No. 202111653919.7.
Office Action issued on Nov. 8, 2024 for related Korean Patent Application No. 10-2024-7025021.
Office Action issued on Jan. 28, 2025 for related Japanese Patent Application No. 2 0 2 4-5 3 9 6 1 5.
Search Report dated Jun. 17, 2025 for European patent application No. 22913338.4.

\* cited by examiner

LITHIUM NICKEL MANGANESE COBALT OXIDE HIGH-NICKEL SINGLE-CRYSTAL POSITIVE ELECTRODE MATERIAL AND PREPARATION METHOD THEREFOR

PRIORITY CLAIM

This is a U.S. national stage of application No. PCT/CN2022/108807, filed on Jul. 29, 2022. Priority is claimed on the following application: China Patent Application No.: 202111653919.7 filed on Dec. 30, 2021, the entire content of which is incorporated here by reference.

TECHNICAL FIELD

The present application relates to the technical field of lithium batteries, and in particular to a lithium nickel manganese cobalt oxide high-nickel single-crystal positive electrode material and a preparation method thereof.

BACKGROUND $LiNi_xCo_yMn_{1-x-y}O_2$ ternary positive electrode materials have been widely used in lithium-ion secondary batteries due to their high specific capacity and energy density, low cost and relatively environmentally friendly characteristics. Especially in the current context, they have broad development space in the automotive power battery market. With the increase in cruising range, the current positive electrode materials are gradually developing towards high nickel and high voltage. Single-crystal positive electrode materials have attracted much attention due to their advantages of relatively high electrode plate compaction and low gas production. However, there are two problems in the sintering process of high-nickel single-crystal materials: first, when the sintering temperature is slightly lower, although the discharge specific capacity is high, the single-crystals are aggregated and the dispersion is poor, resulting in a decreased cycle performance and increased gas production; second, when the sintering temperature is high, the single-crystal size is large and the dispersion is good, but the discharge specific capacity is significantly reduced.

Therefore, how to prepare high-nickel single-crystal positive electrode materials with high capacity, large size and high dispersibility remains a huge challenge.

SUMMARY OF THE INVENTION

The purpose of the present invention is to overcome the above-mentioned technical deficiencies, propose a lithium nickel manganese cobalt oxide high-nickel single-crystal positive electrode material and a preparation method thereof, and solve the technical issues that high-nickel single-crystal positive electrode materials in the prior art are difficult to balance high capacity, large size and high dispersibility.

The first aspect of the present invention provides a method for preparing a lithium nickel manganese cobalt oxide high-nickel single-crystal positive electrode material, comprising the following steps:

mixing and ball milling nickel cobalt manganese hydroxide with a lithium source, zirconium oxide, tungsten oxide and sodium carbonate, then performing primary sintering, pulverizing and then obtaining a lithium nickel manganese cobalt oxide high-nickel single-crystal positive electrode material intermediate; wherein the temperature of the primary sintering is 50° C. to 150° C. higher than a normal sintering temperature; and evenly mixing the lithium nickel manganese cobalt oxide high-nickel single-crystal positive electrode material intermediate and a coating agent, and then performing secondary sintering to obtain a lithium nickel manganese cobalt oxide high-nickel single-crystal positive electrode material.

The second aspect of the present invention provides a lithium nickel manganese cobalt oxide high-nickel single-crystal positive electrode material, wherein the lithium nickel manganese cobalt oxide high-nickel single-crystal positive electrode material is obtained by the method for preparing the lithium nickel manganese cobalt oxide high-nickel single-crystal positive electrode material according to the first aspect of the present invention.

Compared with the prior art, the beneficial effects of the present invention include:

The present invention introduces tungsten oxide and sodium carbonate during the primary sintering. Due to the existence of oxygen vacancies inside the high-nickel material and some sodium ions occupying lithium sites, the W—O octahedron will be distorted in different ways such as inclination and rotation, which will affect the crystal cell and electronic structure of the material to different degrees. the conductivity of the material can be enhanced, and particle morphology can also be changed, so that primary particles can be refined, and by using the characteristic of combining the tungsten oxide and sodium carbonate in combination with zirconium oxide doping, a high-nickel single-crystal positive electrode material having high capacity, high dispersibility, and excellent cycle performance is obtained at a high primary sintering temperature.

DETAILED DESCRIPTION

Figure 1:
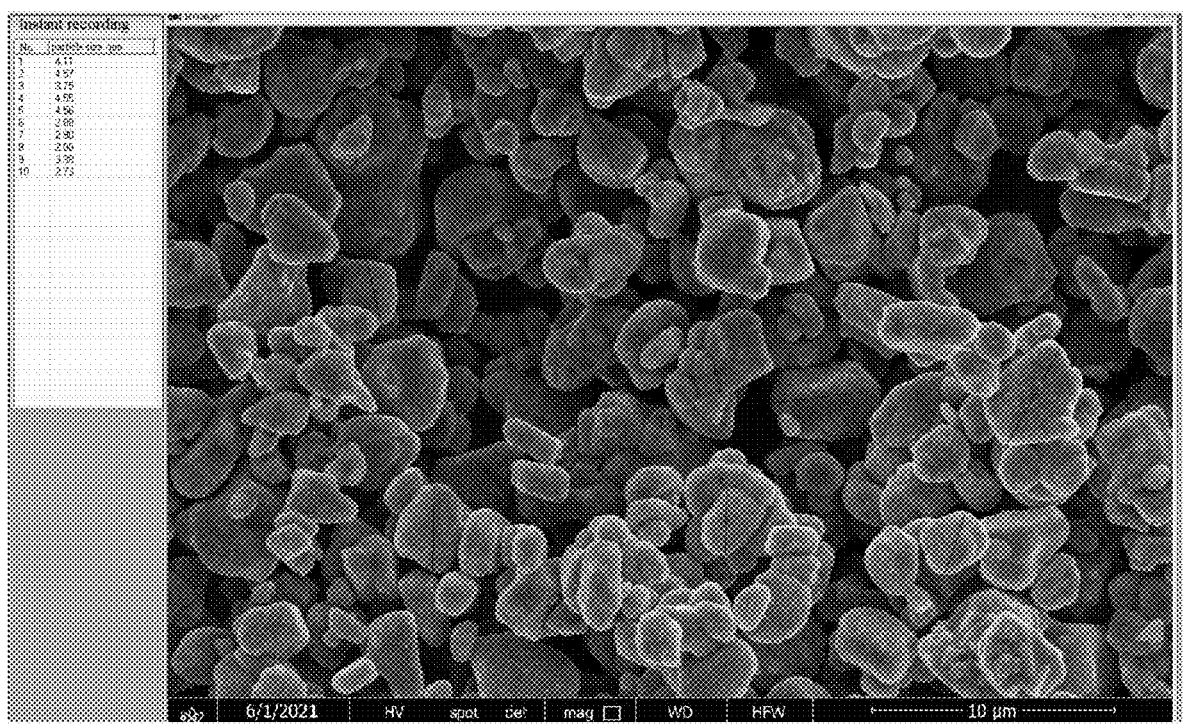
FIG. 1 is a SEM image of the lithium nickel manganese cobalt oxide high-nickel single-crystal positive electrode material provided by Example 1 of the present invention.

In order to make the purpose, technical solution and advantages of the present invention more clearly understood, the present invention is further described in detail below in conjunction with the accompanying drawings and embodiments. It should be understood that the specific embodiments described here are only used to explain the present invention and are not used to limit the present invention.

The first aspect of the present invention provides a method for preparing a lithium nickel manganese cobalt oxide high-nickel single-crystal positive electrode material, comprising the following steps:

S1, mixing and ball milling nickel cobalt manganese hydroxide with a lithium source, zirconium oxide, tungsten oxide and sodium carbonate, then performing primary sintering, pulverizing and then obtaining a lithium nickel manganese cobalt oxide high-nickel single-crystal positive electrode material intermediate; wherein the temperature of the primary sintering is 50° C. to 150° C. higher than a normal sintering temperature; and S2, evenly mixing the lithium nickel manganese cobalt oxide high-nickel single-crystal positive electrode material intermediate and a coating agent, and then performing secondary sintering to obtain a lithium nickel manganese cobalt oxide high-nickel single-crystal positive electrode material.

The present invention introduces tungsten oxide and sodium carbonate as dopant during the primary sintering. Due to the existence of oxygen vacancies inside the high-nickel material and some sodium ions occupying lithium sites, the W—O octahedron will be distorted in different ways such as inclination and rotation, which will affect the crystal cell and electronic structure of the material to different degrees. the conductivity of the material can be enhanced, and particle morphology can also be changed, so that primary particles can be refined, and by using the characteristic of combining the tungsten oxide and sodium carbonate in combination with zirconium oxide doping, a high-nickel single-crystal positive electrode material having high capacity, high dispersibility, and excellent cycle performance is obtained at a high primary sintering temperature. However, the sintering temperature should not be too high. Too high will lead to excessive growth of single-crystal, longer lithium ion transmission path, reduced ion conductivity, and reduced capacity and rate performance.

In the present invention, the chemical composition of the nickel cobalt manganese hydroxide is: $Ni_xCo_yMn_{1-x-y}(OH)_2$, $0.7 \leq x \leq 0.95$, $0.02 \leq y \leq 0.25$; in some specific embodiments of the present invention, the chemical composition of the lithium nickel manganese cobalt oxide high-nickel single-crystal positive electrode material precursor is: $Ni_{0.80}Co_{0.10}Mn_{0.10}(OH)_2$.

In the present invention, the lithium source is at least one of lithium carbonate, lithium hydroxide, lithium nitrate and lithium chloride; a molar ratio of the nickel cobalt manganese hydroxide to lithium in the lithium source is 1:(1.01 to 1.1).

In the present invention, a molar ratio of the nickel cobalt manganese hydroxide to zirconium oxide, tungsten oxide, and sodium carbonate is 1:(0.001 to 0.005):(0.001 to 0.005):(0.001 to 0.005), and further 1:0.002:0.0016:0.002. By doping and introducing tungsten oxide, sodium carbonate and zirconium oxide into the system, a single-crystal material with good dispersibility, excellent discharge specific capacity and cycle performance is obtained. However, the content of sodium carbonate introduced should not be too high. If too much is added, the amount of residual alkali in the system will increase, which is not conducive to improving battery performance.

In the present invention, the temperature of the primary sintering is $T_1$, the normal sintering temperature is $T_2$, and $\Delta T = T_1 - T_2 = 50°$ C. to 150° C., further 60° C. to 100° C., and further 70° C. to 80° C. It should be noted that the normal sintering temperature $T_2$ is obtained by a primary sintering DOE test of nickel cobalt manganese hydroxide and lithium source, and the nickel cobalt manganese single-crystal positive electrode material-sintered material obtained from the above test has the largest discharge specific capacity after electrochemical testing, the sintering temperature with the best single-crystal dispersibility (i.e, the optimal sintering temperature). The optimal sintering temperature is related to the molar ratio of transition metal elements and lithium ratio of nickel cobalt manganese hydroxide, and different nickel cobalt manganese hydroxides and different lithium ratios correspond to different optimal sintering temperatures. For example, when the lithium ratio of $Ni_{0.8}Co_{0.1}Mn_{0.1}(OH)_2$ to lithium hydroxide is 1.05, the optimal sintering temperature is 870° C.

In the present invention, a time of the primary sintering is in a range from 10 h to 20 h.

In the present invention, the type of coating agent is not limited, and those skilled in the art can select according to actual needs. For example, the coating agent can be an oxide or a hydroxide of B, Al, Mg, V, Ti, P, Si and Y. The amount of the coating agent added is 0.05 wt % to 5 wt % of the total amount of the lithium nickel manganese cobalt oxide high-nickel single-crystal positive electrode material intermediate; in this process, a temperature of the secondary sintering is in a range from 200° C. to 600° C., a time of the secondary sintering is in a range from 6 h to 24 h. In the present invention, by forming a coating layer on the surface of the lithium nickel manganese cobalt oxide high-nickel single-crystal positive electrode material intermediate, the side reaction between the single-crystal and the electrolyte can be reduced, and the service life of the battery can be further improved.

In the present invention, both the primary sintering process and the secondary sintering process are carried out under oxygen conditions.

The second aspect of the present invention provides a lithium nickel manganese cobalt oxide high-nickel single-crystal positive electrode material, wherein the lithium nickel manganese cobalt oxide high-nickel single-crystal positive electrode material is obtained by the method for preparing the lithium nickel manganese cobalt oxide high-nickel single-crystal positive electrode material according to the first aspect of the present invention.

Example 1

(1) 2.0 kg of $Ni_{0.80}Co_{0.10}Mn_{0.10}(OH)_2$ powder, 0.93 kg of $LiOH \cdot H_2O$, 5.78 g of nano-$ZrO_2$, 8.10 g of $WO_3$ and 4.95 g of sodium carbonate were weighted and mixed uniformly in a ball mill mixer, then the mixture was placed in an oxygen atmosphere furnace for calcination at a calcination temperature of 950° C., and a sintering time of 15 h. After the reaction was completed, the lithium nickel manganese cobalt oxide high-nickel single-crystal positive electrode material intermediate was obtained through cooling, crushing and sieving;

(2) 4.65 g of $Y_2O_3$ and lithium nickel manganese cobalt oxide high-nickel single-crystal positive electrode material intermediate were mixed evenly, and then heat-treated at 500° C. for 10 h in a high oxygen atmosphere to obtain yttrium-coated lithium nickel manganese cobalt oxide high-nickel single-crystal positive electrode material.

Example 2

(1) 2.0 kg of $Ni_{0.80}Co_{0.10}Mn_{0.10}(OH)_2$ powder, 0.93 kg of $LiOH \cdot H_2O$, 5.78 g of nano-$ZrO_2$, 8.10 g of $WO_3$ and 4.95 g of sodium carbonate were weighted and mixed uniformly in a ball mill mixer, then the mixture was placed in an oxygen atmosphere furnace for calcination at a calcination temperature of 930° C., and a sintering time of 20 h. After the reaction was completed, the lithium nickel manganese cobalt oxide high-nickel single-crystal positive electrode material intermediate was obtained through cooling, crushing and sieving;

(2) 4.65 g of $Y_2O_3$ and lithium nickel manganese cobalt oxide high-nickel single-crystal positive electrode material intermediate were mixed evenly, and then heat-treated at 500° C. for 10 h in a high oxygen atmosphere to obtain yttrium-coated lithium nickel manganese cobalt oxide high-nickel single-crystal positive electrode material.

Example 3

(1) 2.0 kg of $Ni_{0.80}Co_{0.10}Mn_{0.10}(OH)_2$ powder, 0.93 kg of $LiOH \cdot H_2O$, 5.78 g of nano-$ZrO_2$, 8.10 g of $WO_3$ and 4.95 g of sodium carbonate were weighted and mixed uniformly in a ball mill mixer, then the mixture was placed in an oxygen atmosphere furnace for calcination at a calcination temperature of 970° C., and a sintering time of 10 h. After the reaction was completed, the lithium nickel manganese cobalt oxide high-nickel single-crystal positive electrode material intermediate was obtained through cooling, crushing and sieving;

(2) 4.65 g of $Y_2O_3$ and lithium nickel manganese cobalt oxide high-nickel single-crystal positive electrode material intermediate were mixed evenly, and then heat-treated at 500° C. for 10 h in a high oxygen atmosphere to obtain yttrium-coated lithium nickel manganese cobalt oxide high-nickel single-crystal positive electrode material.

Comparative Example 1

Compared with Example 1, the only difference is that the dopant is zirconia only.

Comparative Example 2

Compared with Example 1, the only difference is that $WO_3$ is not added into the dopant.

Comparative Example 3

Compared with Example 1, the difference is only that sodium carbonate is not added into the dopant.

Comparative Example 4

Compared with Example 1, the only difference is that zirconia is not added into the dopant.

Comparative Example 5

Compared with Example 1, the only difference is that the temperature of primary sintering is 870° C.

Comparative Example 6

Compared with Example 1, the only difference is that the temperature of primary sintering is 1050° C.

Test Group

Figure 2:
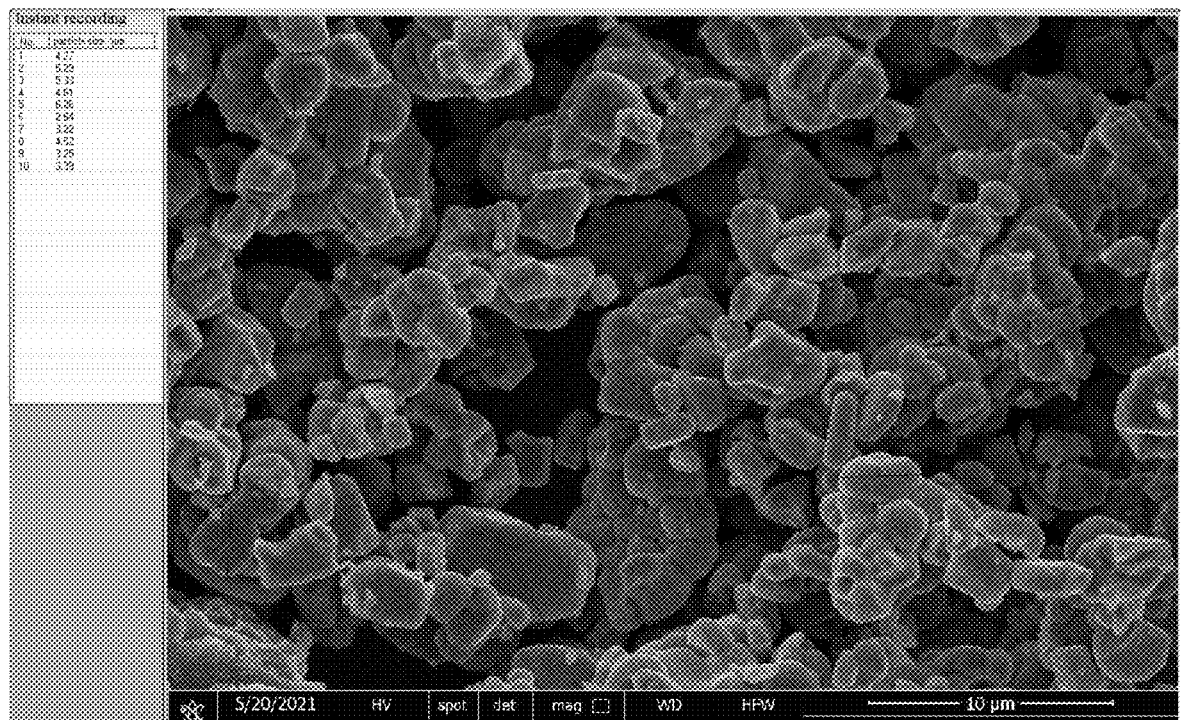
FIG. 2 is a SEM image of the lithium nickel manganese cobalt oxide high-nickel single-crystal positive electrode material provided by Comparative Example 1 of the present invention.
Figure 3:
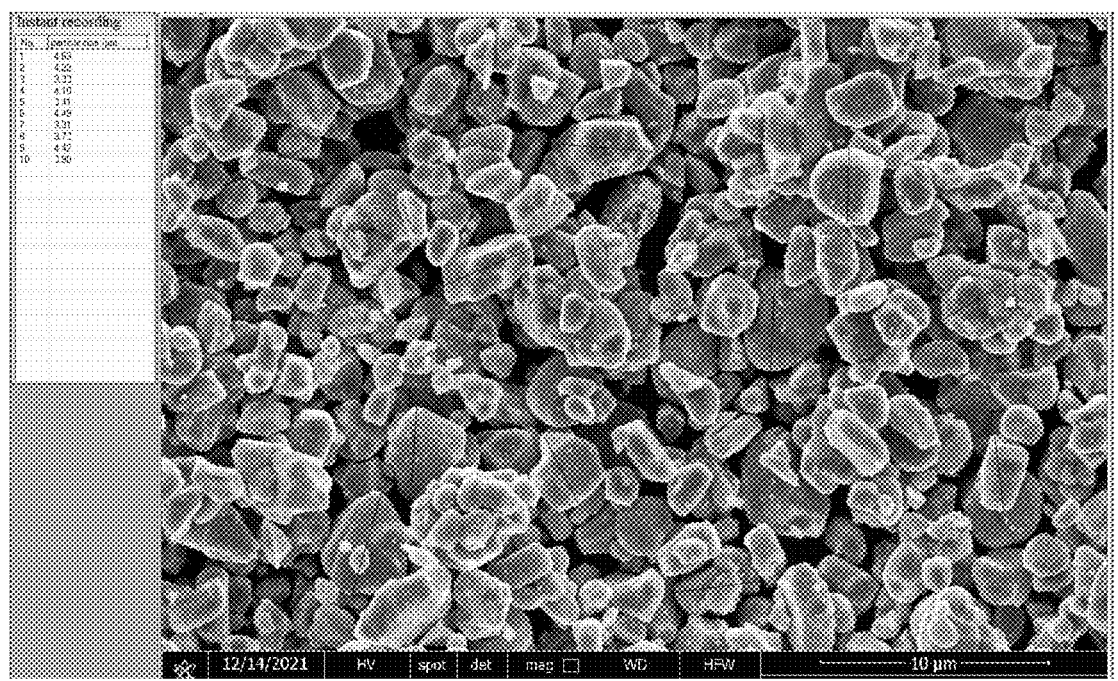
FIG. 3 is a SEM image of the lithium nickel manganese cobalt oxide high-nickel single-crystal positive electrode material provided by Comparative Example 2 of the present invention.
Figure 4:
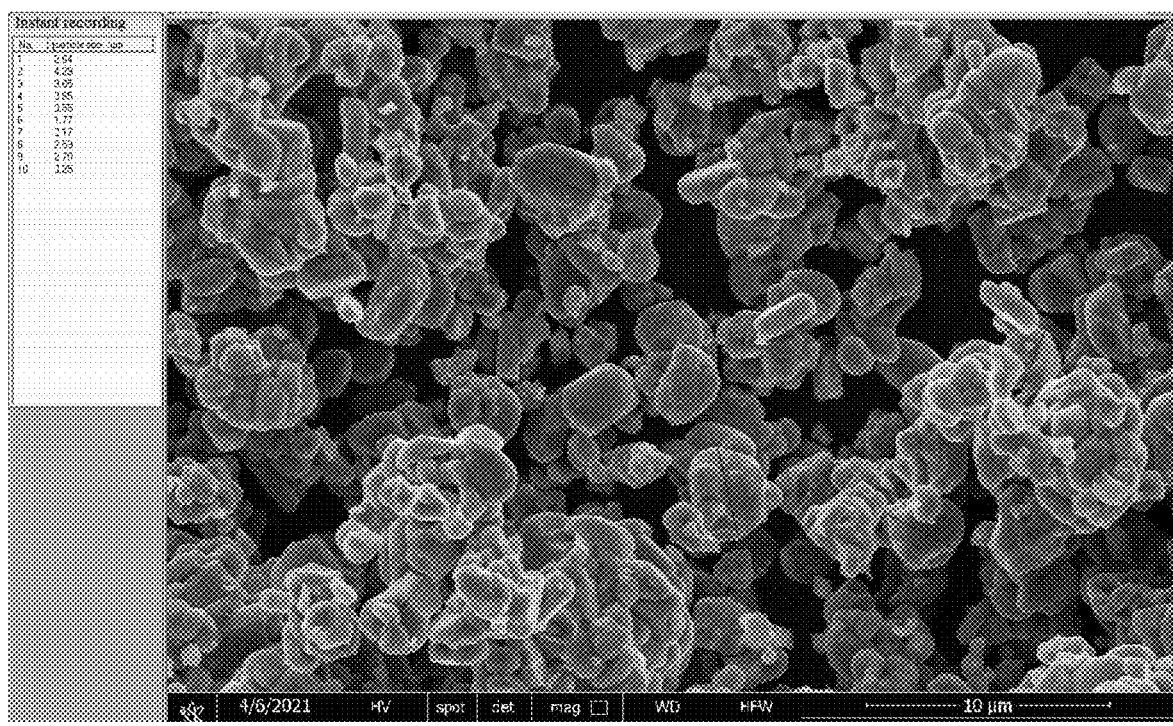
FIG. 4 is a SEM image of the lithium nickel manganese cobalt oxide high-nickel single-crystal positive electrode material provided by Comparative Example 3 of the present invention.
Figure 5:
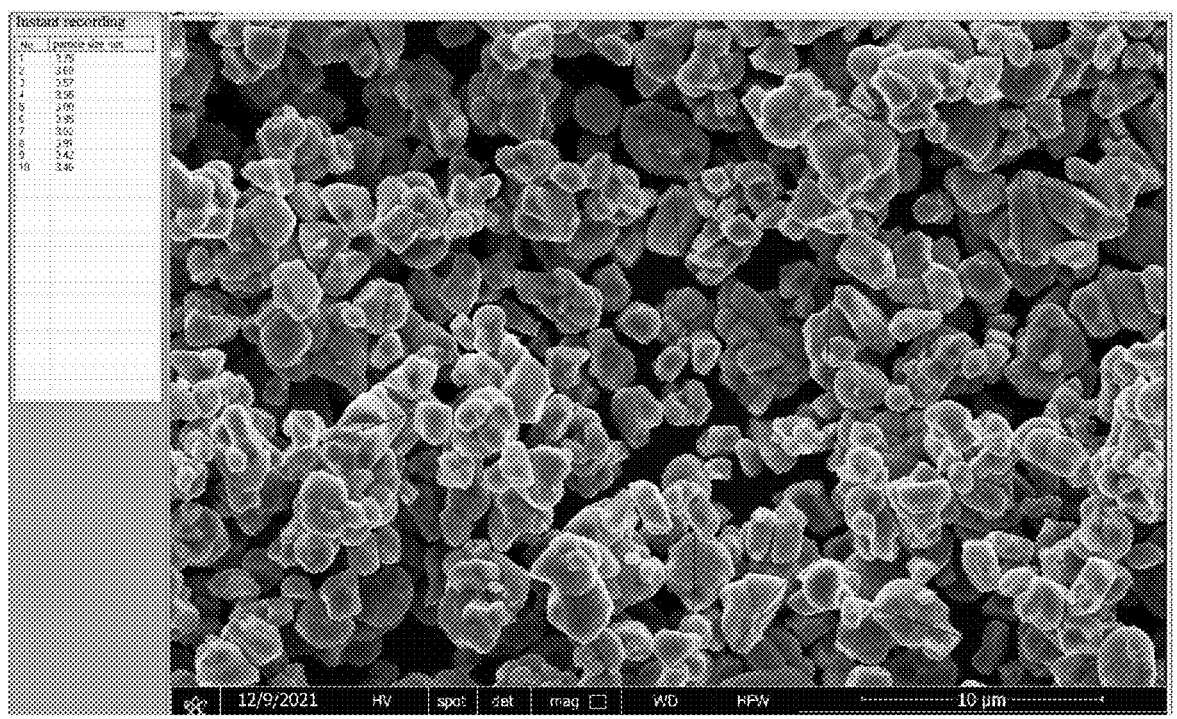
FIG. 5 is a SEM image of the lithium nickel manganese cobalt oxide high-nickel single-crystal positive electrode material provided by Comparative Example 4 of the present invention.
Figure 6:
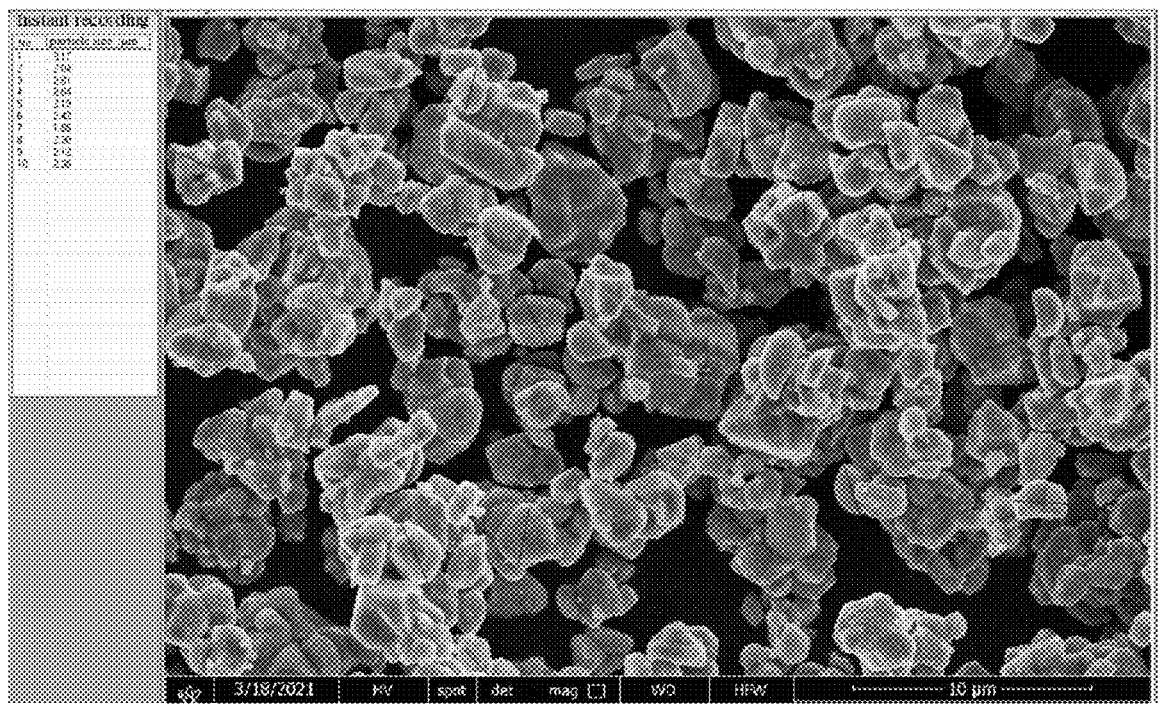
FIG. 6 is a SEM image of the lithium nickel manganese cobalt oxide high-nickel single-crystal positive electrode material provided by Comparative Example 5 of the present invention.
Figure 7:
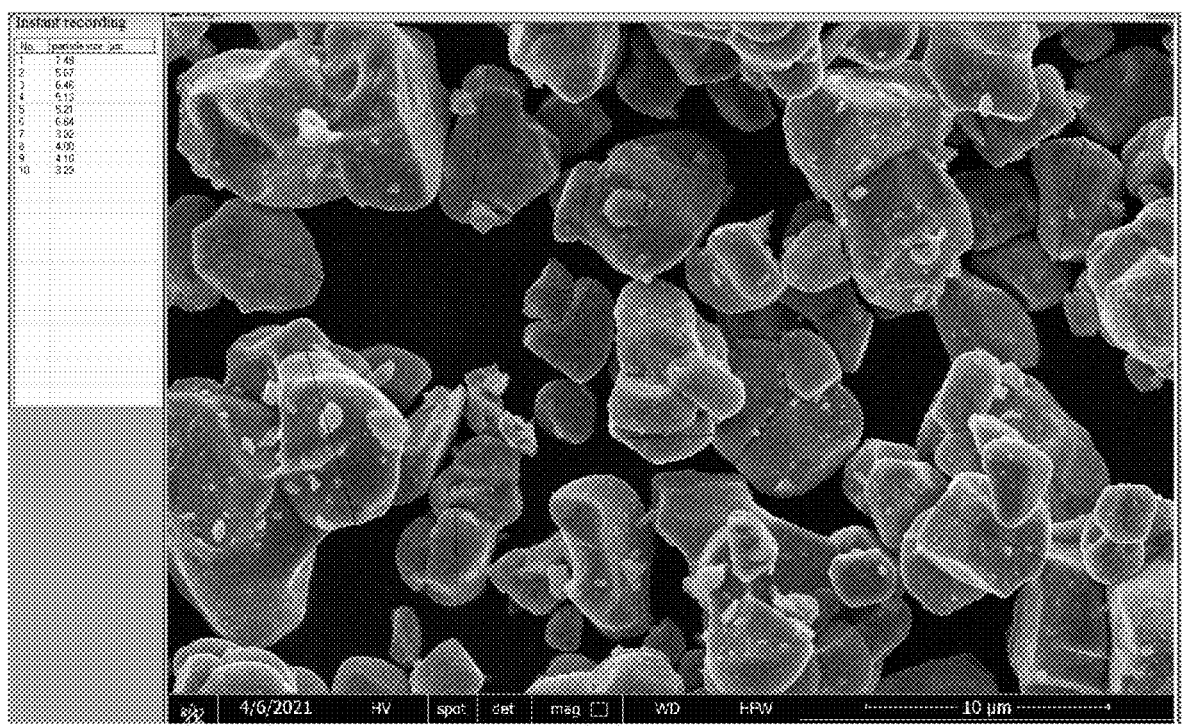
FIG. 7 is a SEM image of the lithium nickel manganese cobalt oxide high-nickel single-crystal positive electrode material provided by Comparative Example 6 of the present invention.

The positive electrode materials prepared in Example 1 and Comparative Examples 1-6 of the present invention were tested by SEM, and the test results were shown in FIGS. 1-7 and Table 1.

The positive electrode materials prepared in Example 1 and Comparative Examples 1-6 of the present invention was mixed with conductive agent acetylene carbon black and binder PVDF according to the mass ratio of 92:4:4, and an appropriate amount of 1-methyl-2-pyrrolidone were added and ball milled for 1 h to form a slurry evenly coated on the aluminum plate, dried and pressed to make a positive electrode plate. 2032 button batteries were assembled by using metal lithium plates as the negative electrode, and the WUHAN LAND test system was used for electrical performance testing. The charge and discharge voltage was in a range from 3.0V to 4.3V. The first cycle was charged and discharged at 0.2 C/0.2 C, and then cycled 200 cycles at 1 C/1 C, and the results were shown in Table 1.

TABLE 1

| | Average particle size (μm) | Discharge specific capacity (mAh/g) | Retention rate after 200 cycles(%) |
|---|---|---|---|
| Example1 | 3.63 | 201.5 | 97.9 |
| Comparative Example 1 | 4.28 | 181.9 | 90.1 |
| Comparative Example 2 | 4.0 | 192.7 | 90.8 |
| Comparative Example 3 | 3.05 | 194.3 | 92.3 |
| Comparative Example 4 | 3.65 | 200.1 | 89.8 |
| Comparative Example 5 | 2.4 | 203.2 | 85.3 |
| Comparative Example 6 | 5.20 | 160.3 | 60.6 |

It can be seen from Table 1 that compared with Comparative Examples 1 to 6, the lithium nickel manganese cobalt oxide high-nickel single-crystal positive electrode material prepared in Example 1 of the present invention has a large single-crystal size, good dispersibility, and high discharge specific capacity, and good cycle stability.

Compared with Example 1, the high-nickel single-crystal positive electrode material obtained in Comparative Example 1 has a larger average particle size, but it still has poor discharge specific capacity and cycle performance. The reason is that only zirconia is added in Comparative Example 1, and in the absence of tungsten oxide and sodium carbonate, the sintering temperature is relatively high, and the electrochemical performance is still poor.

Compared with Example 1, the high-nickel single-crystal positive electrode material obtained in Comparative Example 2 has a larger average particle size, but it still has poor discharge specific capacity and cycle performance. The reason is that tungsten oxide is not added in Comparative Example 2, and the role of tungsten oxide in enhancing the conductivity and refining the primary particles in the system cannot be exerted, which ultimately leads to the high-nickel single-crystal positive electrode material obtained in Comparative Example 2 having poor electrochemical performance.

Compared with Example 1, the average particle size of the high-nickel single-crystal positive electrode material obtained in Comparative Example 3 is significantly reduced, at the same time it has poor discharge specific capacity and cycle performance. The reason is that sodium carbonate is not added in Comparative Example 3, which cannot cooperate with tungsten oxide to increase the single-crystal size and improve the dispersibility, ultimately causes the high-nickel single-crystal positive electrode material obtained in Comparative Example 3 to have poor electrochemical performance.

Compared with Example 1, the high-nickel single-crystal positive electrode material obtained in Comparative Example 4 has a large single-crystal size, good dispersibility, and discharge specific capacity, but poor cycle performance. The reason is that zirconia is not added in Comparative Example 4, resulting in a decrease in the structural stability of the crystal compared with that of Example 1.

Compared with Example 1, the average particle size and cycle performance of the high-nickel single-crystal positive electrode material obtained in Comparative Example 5 were significantly reduced. The reason is that, compared with Example 5, the sintering temperature is not increased, resulting in the a small single crystal size and poor dispersion of the obtained positive electrode material, and a significantly reduced cycle performance.

Compared with Example 1, the average particle size of the high-nickel single-crystal positive electrode material obtained in Comparative Example 6 is significantly increased, but its discharge specific capacity and cycle performance are significantly reduced. The reason is that the sintering temperature of Comparative Example 6 is too high, resulting in excessive growth of single-crystal, longer lithium-ion transmission path, reduced ion conductivity, resulting in a decrease in capacity and rate performance.

The specific embodiments of the present invention described above do not constitute limitations to the protection scope of the present invention. Any other corresponding changes and modifications made according to the technical concept of the present invention shall be included in the protection scope of the claims of the present invention.

The invention claimed is:

1. A method for preparing a lithium nickel manganese cobalt oxide high-nickel single-crystal positive electrode material, wherein the method comprises the following steps:
    mixing and ball milling nickel cobalt manganese hydroxide with a $LiOH \cdot H_2O$, zirconium oxide, tungsten oxide and sodium carbonate, then performing primary sintering, pulverizing and then obtaining a lithium nickel manganese cobalt oxide high-nickel single-crystal positive electrode material intermediate, wherein: a molar ratio of the nickel cobalt manganese hydroxide to zirconium oxide, tungsten oxide, and sodium carbonate is 1:0.002:0.0016:0.002, the chemical composition of the nickel cobalt manganese hydroxide is $Ni_{0.80}Co_{0.10}Mn_{0.10}(OH)_2$; a molar ratio of the nickel cobalt manganese hydroxide to lithium in the $LiOH \cdot H_2O$ is 1:1.05, and the temperature of the primary sintering is 950° C., a time of the primary sintering is 15 h;
    evenly mixing the lithium nickel manganese cobalt oxide high-nickel single-crystal positive electrode material intermediate and a coating agent, and then performing secondary sintering to obtain a lithium nickel manganese cobalt oxide high-nickel single-crystal positive electrode material, wherein the coating agent is $Y_2O_3$; the amount of the coating agent added is 0.05 wt % to 5 wt % of the total amount of the lithium nickel manganese cobalt oxide high-nickel single-crystal positive electrode material intermediate; a temperature of the secondary sintering is 500° C., a time of the secondary sintering is in a range from 10 h.

2. The method for preparing a lithium nickel manganese cobalt oxide high-nickel single-crystal positive electrode material according to claim 1, wherein the primary sintering process and the secondary sintering process are all preformed under oxygen conditions.

3. A method for preparing a lithium nickel manganese cobalt oxide high-nickel single-crystal positive electrode material, wherein the method comprises the following steps:
    mixing and ball milling nickel cobalt manganese hydroxide with a $LiOH \cdot H_2O$, zirconium oxide, tungsten oxide and sodium carbonate, then performing primary sintering, pulverizing and then obtaining a lithium nickel manganese cobalt oxide high-nickel single-crystal positive electrode material intermediate; wherein a molar ratio of the nickel cobalt manganese hydroxide to zirconium oxide, tungsten oxide, and sodium carbonate is 1:0.002:0.0016:0.002; the chemical composition of the nickel cobalt manganese hydroxide is $Ni_{0.80}Co_{0.10}Mn_{0.10}(OH)_2$; a molar ratio of the nickel cobalt manganese hydroxide to lithium in the $LiOH \cdot H_2O$ is 1:1.02;
    the temperature of the primary sintering is 950° C.; a time of the primary sintering is 15 h;
    evenly mixing the lithium nickel manganese cobalt oxide high-nickel single-crystal positive electrode material intermediate and a coating agent, and then performing secondary sintering to obtain a lithium nickel manganese cobalt oxide high-nickel single-crystal positive electrode material; the coating agent is $Y_2O_3$; the amount of the coating agent added is 0.05 wt % to 5 wt % of the total amount of the lithium nickel manganese cobalt oxide high-nickel single-crystal positive electrode material intermediate; a temperature of the secondary sintering is 500° C., a time of the secondary sintering is 10 h.

* * * * *